(12) United States Patent
Wang et al.

(10) Patent No.: US 11,439,272 B2
(45) Date of Patent: Sep. 13, 2022

(54) INDUCTION HEATING FOOD PROCESSOR

(71) Applicant: Instant Brands Inc., Ottawa (CA)

(72) Inventors: Jiwei R. Wang, Ottawa (CA); Yi Qin, Ottawa (CA)

(73) Assignee: Instant Brands Inc., Ottawa (CA)

( * ) Notice: Subject to any disclaimer, the term of this patent is extended or adjusted under 35 U.S.C. 154(b) by 243 days.

(21) Appl. No.: 16/546,954

(22) Filed: Aug. 21, 2019

(65) Prior Publication Data

US 2020/0069110 A1     Mar. 5, 2020

(30) Foreign Application Priority Data

Aug. 31, 2018   (CA) ................................ CA 3016047

(51) Int. Cl.
| | | |
|---|---|---|
| A47J 36/24 | (2006.01) | |
| H05B 6/12 | (2006.01) | |
| A47J 36/16 | (2006.01) | |
| A47J 27/00 | (2006.01) | |
| A47J 43/07 | (2006.01) | |

(52) U.S. Cl.
CPC ......... *A47J 36/2433* (2013.01); *A47J 27/002* (2013.01); *A47J 36/165* (2013.01); *A47J 43/0716* (2013.01); *H05B 6/12* (2013.01); *H05B 6/1245* (2013.01)

(58) Field of Classification Search
CPC ...... A47J 43/046; A47J 43/0465; A47J 43/07; A47J 43/0716; A47J 43/0722; A47J 43/0761–0794; A47J 43/085; H05B 6/12–1281
See application file for complete search history.

(56) References Cited

U.S. PATENT DOCUMENTS

| | | | |
|---|---|---|---|
| 5,201,797 A | 4/1993 | Weng | |
| 2003/0196945 A1* | 10/2003 | Shiao-Chih | ........ A47J 27/21166 210/222 |
| 2004/0100862 A1* | 5/2004 | Arroubi | ............. A47J 43/0716 366/206 |
| 2010/0000980 A1* | 1/2010 | Popescu | .................. A47J 36/32 219/201 |
| 2010/0170892 A1* | 7/2010 | Wilson | ................... H05B 6/108 219/621 |
| 2015/0245421 A1* | 8/2015 | Heczko | ................ H05B 6/1245 99/323.3 |
| 2017/0071413 A1* | 3/2017 | Park | ....................... A47J 27/004 |
| 2017/0119201 A1* | 5/2017 | Walker | .................... A47J 31/56 |
| 2017/0188743 A1* | 7/2017 | Snyder | ................. H05B 6/1209 |

(Continued)

FOREIGN PATENT DOCUMENTS

| | | |
|---|---|---|
| CA | 3016047 A1 | 2/2020 |
| CN | 205625690 U  * | 10/2016 |

(Continued)

*Primary Examiner* — John J Norton
(74) *Attorney, Agent, or Firm* — Crowell & Moring LLP

(57) ABSTRACT

A food processor is provided. The food processor comprises a base, a container removably mountable on the base for receiving food, a rotatable mixing member disposed within the container for processing the food, an induction coil enclosing at least a portion of the container, and an electrically conducting member removably receivable within the container in a substantially parallel relationship with a surface defined by at least a portion of the induction coil.

12 Claims, 8 Drawing Sheets

(56) References Cited

U.S. PATENT DOCUMENTS

2018/0110371 A1* 4/2018 Perrin ...................... A01J 11/04
2018/0376546 A1* 12/2018 Jang .................... H05B 6/1245

FOREIGN PATENT DOCUMENTS

| CN | 107080472 A | * | 8/2017 | |
|---|---|---|---|---|
| CN | 107080476 A | * | 8/2017 | |
| CN | 211380964 U | * | 9/2020 | |
| DE | 202012104657 U1 | * | 3/2014 | .......... A47J 43/0465 |
| EP | 1731068 B1 | | 10/2007 | |
| WO | 1731068 | | 10/2007 | |

* cited by examiner

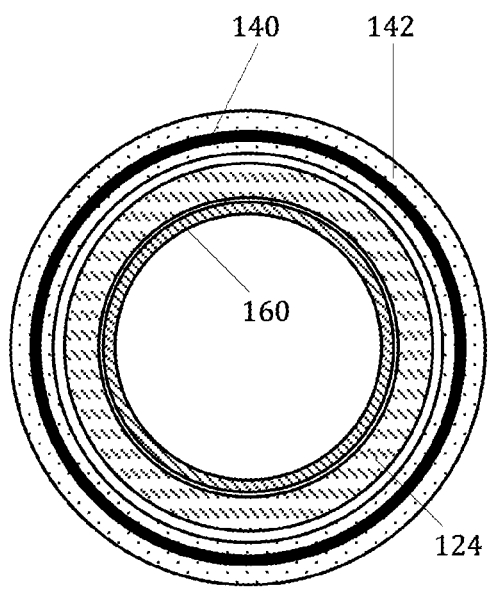
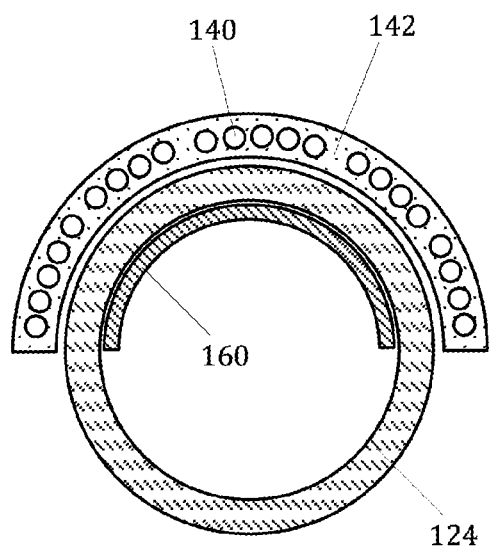
FIG. 2A                    FIG. 2B
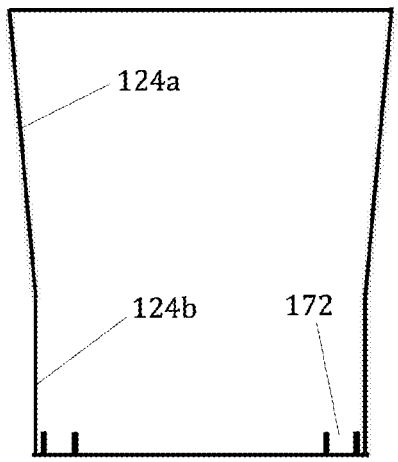
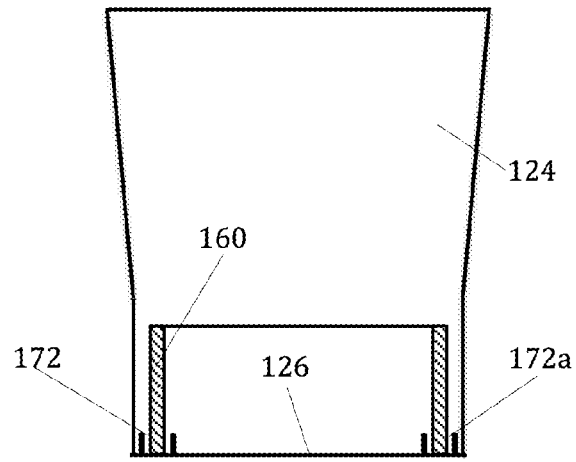
FIG. 3A                    FIG. 3B

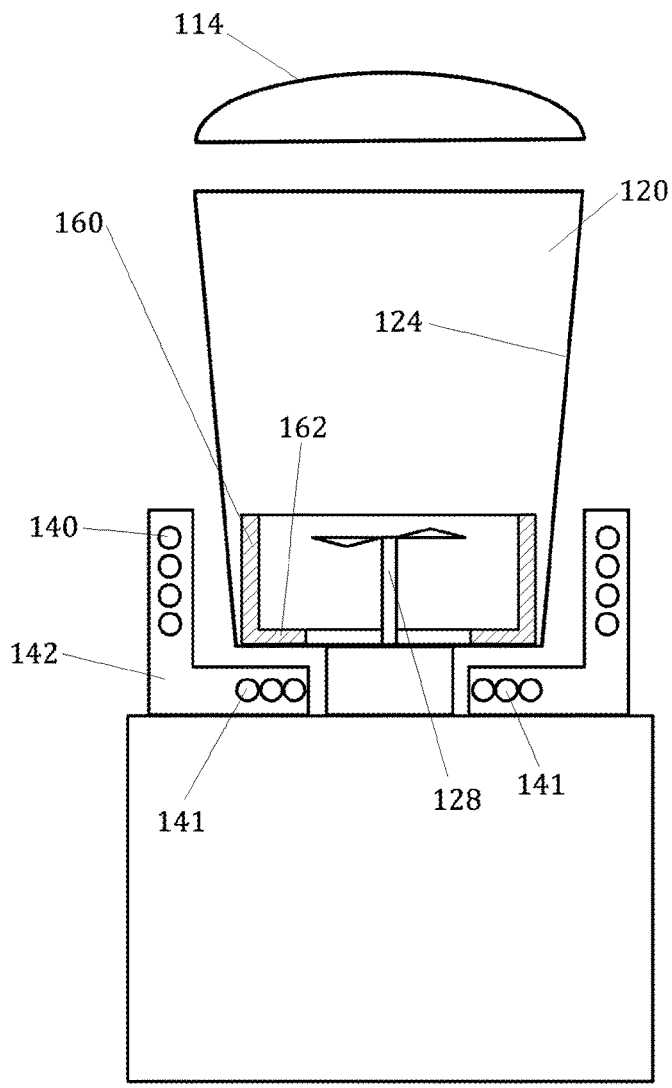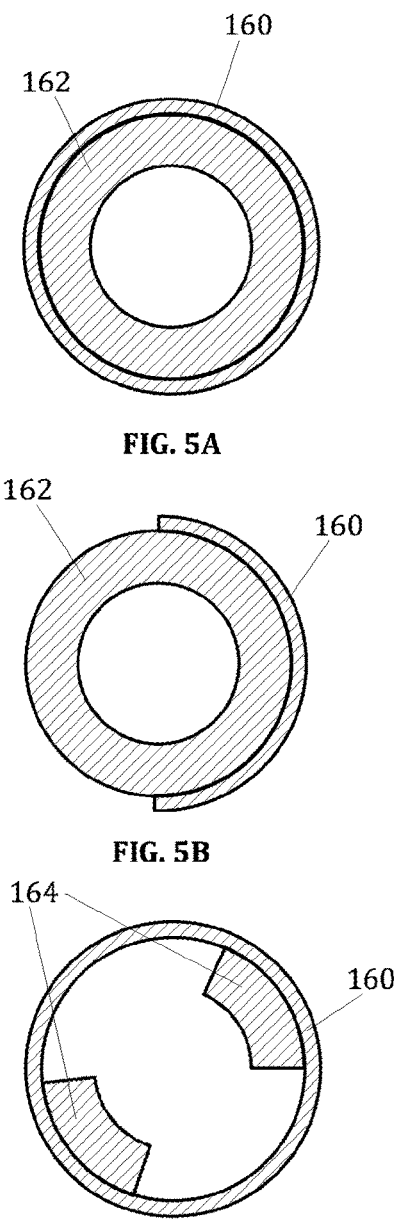
FIG. 5
FIG. 5A
FIG. 5B
FIG. 5C

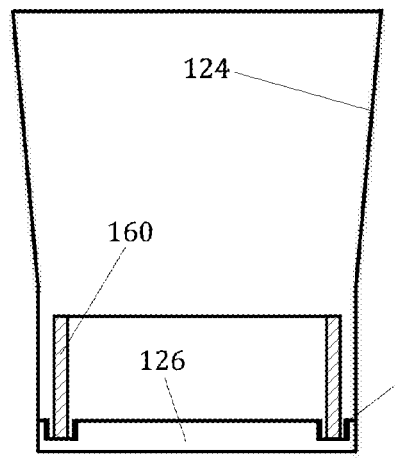
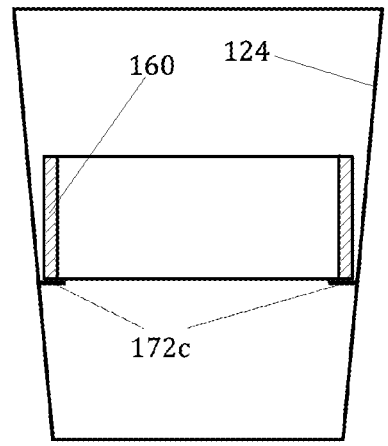
FIG. 6A
FIG. 6B
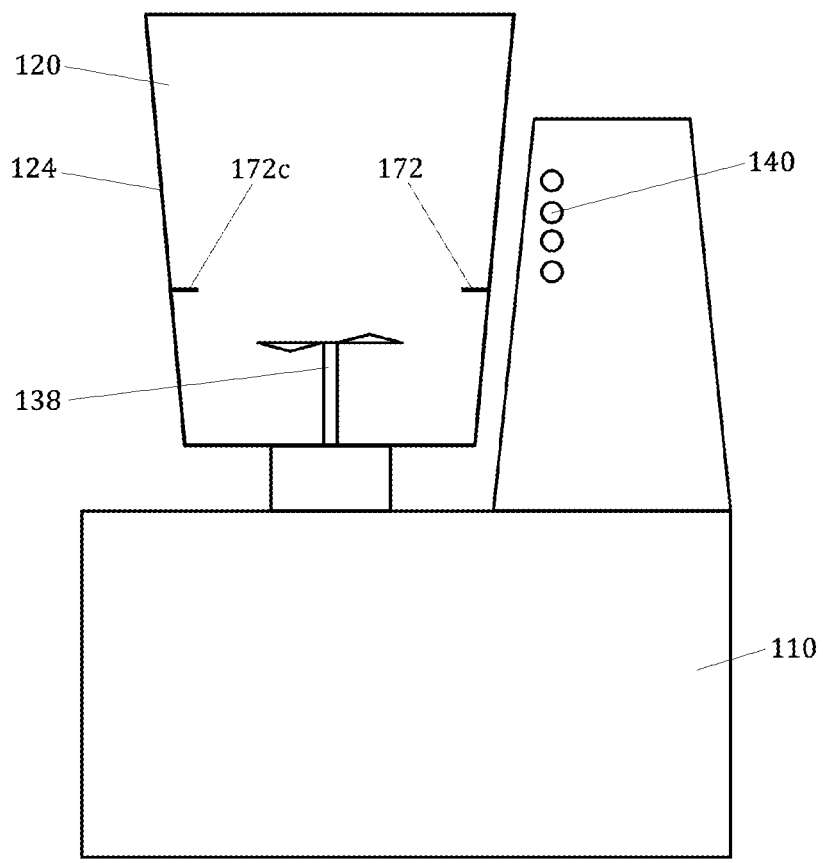
FIG. 6

INDUCTION HEATING FOOD PROCESSOR

CROSS REFERENCE TO RELATED APPLICATIONS

This patent application is a non-provisional patent application of Canadian patent application 3,016,047 filed on Aug. 31, 2018 and entitled "Induction Heating Food Processor", which is hereby incorporated by reference in its entirety.

FIELD OF THE INVENTION

The present invention relates generally to a food processor, and more specifically to a high-speed food blender having an induction heater.

BACKGROUND OF THE INVENTION

Various food processors with induction heaters are known. For example, U.S. Pat. No. 5,201,797 discloses an induction heater having a cylindrical cooking receptacle encased by an electromagnetic induction coil, which allows warming up of food contained in a metal can placed in the cooking receptacle.

EP1731068B1 discloses a food blender comprising a metal food container the outer layer of which has a lower cylindrical portion made of ferromagnetic stainless steel. This ferromagnetic cylindrical portion of the container functions as a built-in heating element of the container when excited by an induction coil surrounding the ferromagnetic cylindrical portion of the container.

The known induction heating food processors have certain limitations in their operations and maintenance. For example, under high-speed cutting, blending and heating, certain foods, such as those containing rice, beans, legumes or nuts, tend to stick to the inner wall of the food container, making the cleaning of the food container not only burdensome, but also unsafe and time consuming. In addition, the currently known heated food blenders have relatively poor or inefficient heating performance, resulting in poorly prepared food, lost nutrition, waste of electric energy, and ultimately unsatisfactory user experience.

Therefore, there is a need for an improved induction heating food processor.

SUMMARY OF THE INVENTION

The present invention overcomes the shortcomings of the prior art by providing improvements to the structures, configurations, components, and operations of existing induction heating blenders. The present invention provides a food processor having an induction heating element that is removably receivable within a food processing container and an induction heating device substantially enclosing at least a portion of a sidewall of the food processing container. The present invention further provides various configurations of the removable induction heating element for use with the food processor, and examples of an improved food processor for use with the removable induction heating element.

In accordance with one aspect of the present disclosure, there is provided a food processor comprising: a base; a container removably mountable on the base for receiving food; a rotatable mixing member disposed within the container for processing the food; an induction heating device constructed and arranged to enclose at least a portion of a sidewall of the container; and an electrically conducting member removably receivable within the container in a substantially parallel relationship with a surface defined by at least a portion of the induction heating device.

In accordance with another aspect of the present disclosure, there is provided a food processor comprising: a base; a container removably mountable on the base for receiving food, the container comprising a heating element support structure formed on an inner wall of the container; a rotatable mixing member disposed within the container for processing the food; and an induction heating device supported by the base and being constructed and arranged to enclose at least a portion of a sidewall of the container.

In accordance with another aspect of the present disclosure, there is provided an induction-heating element for removable placement within a container of a food processor at least partially enclosed by an induction heating device at a suitable location for heating generation by way of inductive coupling with the induction heating device.

Other features and advantages of the present invention will become apparent from the following detailed description and the accompanying drawings, which illustrate, by way of example, the principles of the invention.

BRIEF DESCRIPTION OF THE DRAWINGS

By way of example only, preferred embodiments of the present invention are described hereinafter with reference to the accompanying drawings, wherein:

FIGS. 2A-2B are schematic representations of partial sectional top views illustrating certain parts of the food processor in accordance with example embodiments of the present disclosure;

FIGS. 3A-3B are schematic representations of partial sectional side views illustrating a container of the food processor in accordance with an example embodiment of the present disclosure;

FIG. 5 is a schematic representation of a partial sectional side view illustrating a food processor in accordance with a further example embodiment of the present disclosure;

FIGS. 5A-5C are schematic representations of partial sectional top views illustrating an example of an electrically conducting member of the food processor in accordance with an embodiment of the present disclosure;

FIGS. 6A-6B are schematic representations of partial sectional side views illustrating an example container of the food processor with a heating element support structure in accordance with an embodiment of the present disclosure;

FIG. 6 is a schematic representation of a partial side view illustrating a food processor in accordance with a further example embodiment of the present disclosure;

DETAILED DESCRIPTION

Figure 1:
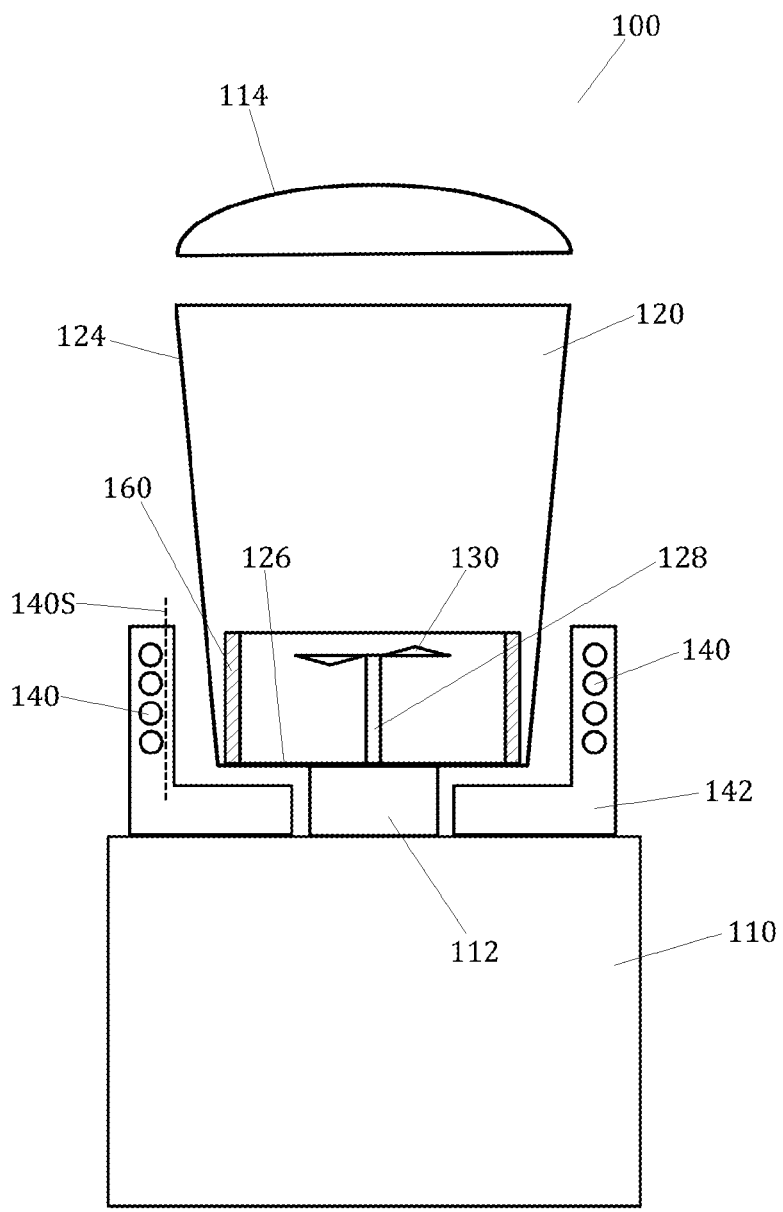
FIG. 1 is a schematic representation of a partial sectional side view illustrating a food processor in accordance with an example embodiment of the present disclosure.

Referring to FIGS. 1-9, an example embodiment of the present invention is illustrated as food processor 100 comprising a base 110; a container 120 removably mountable on the base 110 for receiving food into the container 120; a rotatable mixing member 128 disposed within the container 120 for processing the food; an induction heating device 140 constructed and arranged to enclose at least a portion of a sidewall 124 of the container 120; and an electrically conducting member 160 removably receivable within the container 120 in a substantially parallel relationship with a surface defined by at least a portion of the induction heating device 140.

The base 110 generally provides support and/or housing for various components of the food processor 100. For example, the base 110 may comprise a support member 112, and the container 120 can be removably mounted or sustained on the support member 112, or otherwise removably coupled or secured to the support member 112 or the base 110 by way of known mechanisms, such as twist-on/off, screw-on/off, gears, locks, or other equivalent or similar mechanisms or devices.

Preferably, the container 120 may comprise a handle (not shown) for ease of handling the container 120 and/or mounting and dismounting the container 120 relative to the base 110.

The container 120 can be of any shape, size or configuration. For example, it can be cup-shaped or of the types that are commonly used with conventional food processors or blenders. Preferably, the sidewall 124 of the container 120 or at least a portion thereof is substantially cylindrical. In some embodiments, the substantially cylindrical sidewall 124 has a substantially uniform or identical diameter along a height of the sidewall 124 or a portion thereof. In some embodiments, the substantially cylindrical sidewall 124 has varying diameters along a height thereof or a portion of the height, or has at least two different diameters along a height of the sidewall 124. In some embodiments, the sidewall 124 may have a first portion with a first substantially uniform or identical diameter, and a second portion having a second substantially uniform or identical diameter. As an example, in FIG. 1, the sidewall 124 of the container 120 is shown to have a shape substantially similar to a cylindrical trapezoid, truncated cone, or frustum; whereas in FIG. 3A, the sidewall 124 of the container 120 is shown to have a first portion 124a in tapered cylindrical shape and a second portion 124b in regular cylindrical shape.

In some embodiments, the container 120 has an opening defined by a top rim of the sidewall 124 for inserting food into an interior of the container 120 for processing. A lid 114 can be provided to cover the container 120. The lid 114 can be fixedly connected to the container 120 by way of a joint, pivot, hinge, or similar mechanism, for example, to provide a flip-open type of cover, or can be detached from the container 120 so as to provide a completely removable cover for the container 120. In some embodiments, the container 120 has a bottom portion 126. In some embodiments, the bottom portion 126 may be integrally formed with the sidewall 124 to constitute a unitary piece. For example, the bottom portion 126 may be constructed using the same materials as that of the sidewall 124 and extending from the sidewall 124 toward a central vertical axis of the container 120. In some embodiments, the bottom portion 126 is constructed as a separate component and can be sealingly attached to a lower portion of the sidewall 124. In some embodiments, the bottom portion 126 can be removably attached or connected to the sidewall 124 in a substantially sealed or airtight/watertight fashion.

The food processor 100 comprises a rotatable mixing member 128 disposed within the container 120 for mixing, cutting, stirring, grinding, blending, or otherwise processing the food received in the container 120 by way of rotation actions. In some embodiments, the mixing member 128 is connected or interconnected to a drive shaft powered by an electric motor installed in the base 110. The commonly known mechanisms for connecting the mixing member 128 to the drive shaft and/or the electric motor can be applied herein, and will not be described in detail. The mixing member 128 may comprise at least one blade or knife 130 for cutting the food to be processed.

The food processor 100 comprises an induction heating device 140 enclosing at least a portion of the container 120 or a sidewall 124 thereof. Preferably, the induction heating device is an induction coil 140. In some embodiments, the induction coil 140 is supported by the base 110. For example, the induction coil 140 can be mounted on a coil support 142 secured to the base 110. The induction coil 140 is being constructed and arranged to enclose at least a portion of the sidewall 124 of the container 120. As the sidewall 124 of the container 120 or at least a portion thereof is substantially cylindrical in some embodiments, the induction coil 140 is configured to form a substantially cylindrical or partially cylindrical surface, surrounding or enclosing the sidewall 124 in whole or in part. For example, the induction coil 140 may be arranged to form or enclose a space having a shape or configuration that is substantially similar to a cylindrical trapezoid, truncated cone, or frustum, in whole or in part, wherein a lower portion of the container 120 will be substantially received in this space when the container is securely placed on the base 110. In other words, the induction coil 140 or a portion thereof defines a surface 140S enclosing the sidewall 124 in whole or in part and being spaced apart from the sidewall 124 or a portion thereof. In some embodiments, the shape and/or configuration of the surface 140S defined by the induction coil 140 or a portion thereof enclosing the sidewall 124 substantially matches the portion of the sidewall 124 that is being enclosed, or is in a substantially parallel relationship therewith. In some embodiments, the surface 140S and the enclosed portion of the sidewall 124 are of different kinds of cylindrical shapes, and therefore do not parallel to each other in the strict sense.

Figure 4:
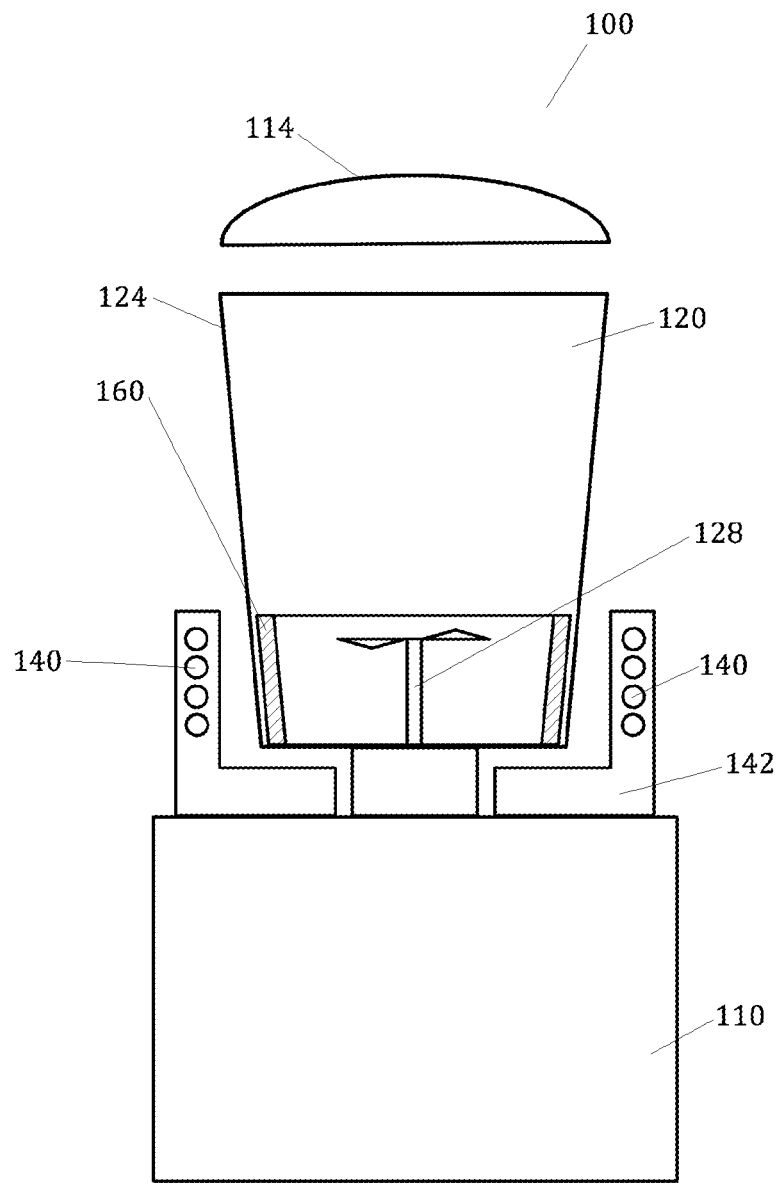
FIG. 4 is a schematic representation of a partial sectional side view illustrating a food processor in accordance with a further example embodiment of the present disclosure.
Figure 7A:
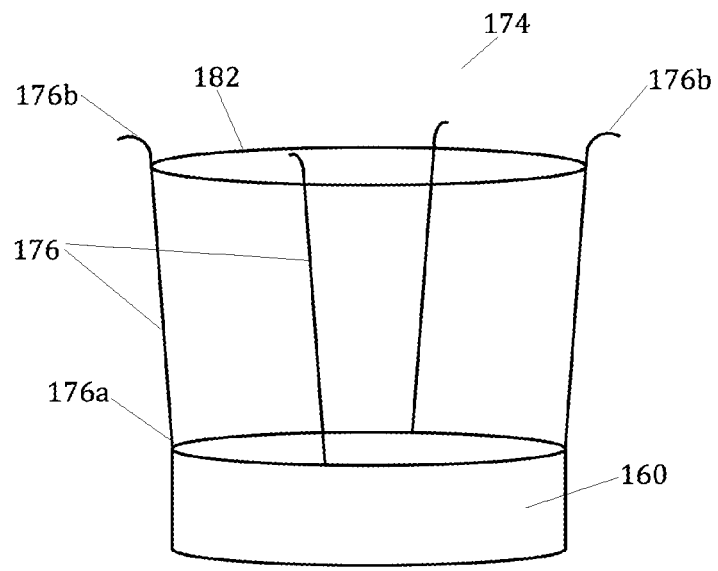
FIGS. 7A-7B are schematic representations of perspective and side views illustrating an example of an electrically conducting member having a support frame in accordance with an embodiment of the present disclosure.
Figure 7B:
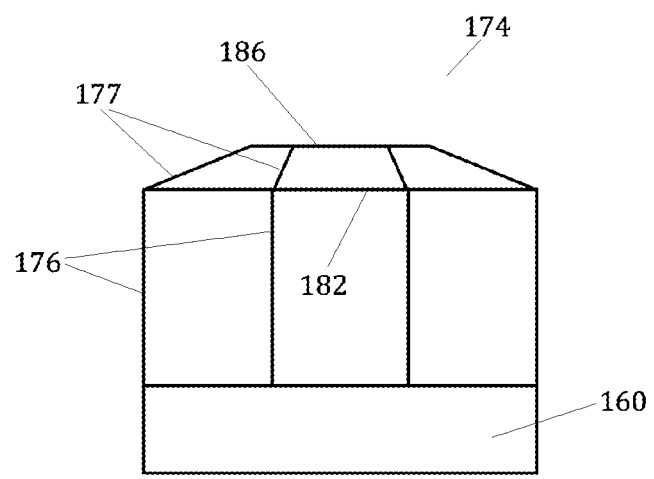

In some embodiments, the food processor 100 comprises an electrically conducting member 160 removably receivable within the container 120 in a substantially parallel relationship with the surface 140S defined by at least a portion of the induction coil 140. Preferably, the electrically conducting member 160 is made of metal or alloy. More preferably, the electrically conducting member 160 is a ferromagnetic metal member 160, such as ferritic stainless steel or martensitic stainless steel. In some embodiments, the ferromagnetic metal member 160 comprises a substantially ring-shaped ferromagnetic band dimensioned to fit within the container 120 so that the ferromagnetic member 160 is substantially parallel with at least a portion of the sidewall 124. For example, at least part of the ferromagnetic metal member 160 is substantially concentric to at least a portion of the sidewall 124. In some embodiments, the ferromagnetic member 160 can be made to form a closed substantially cylindrical ring, while in some other embodiments it can be made to take the form of a partial ring having a partial cylindrical configuration. In some embodiments, as illustrated in FIG. 4, the ferromagnetic member 160 is substantially parallel with or concentric to at least one of the sidewall 124 and the induction coil 140 or respective portions thereof. In this regard, it is not necessary that the ferromagnetic member 160 and the induction coil 140 are parallel in the strict sense. Rather, slight deviations or inclinations are allowed depending on the shape of the container sidewall 124, and such deviations will not affect the principles of the present invention as long as the ferromagnetic member 160 and the induction coil 140 are arranged in substantially similar orientations.

In some embodiments, the ferromagnetic member 160 is sized and shaped for direct placement on the bottom portion 126 within the container 120. Preferably, such ferromagnetic member 160 is dimensioned to substantially enclose the mixing member 128 and spaced apart therefrom to the maximum extent possible (or as close to the sidewall 124 as possible without affecting the removability of the ferromagnetic member 160), so as to minimize the movements of the ferromagnetic member 160 relative to the sidewall 124.

FIG. 2A provides a schematic partial top sectional view illustration of an example configuration for the container 120, the induction coil 140, and the ferromagnetic metal member 160 removably receivable within the container 120, wherein both the ferromagnetic member 160 and the induction coil 140 are arranged in substantially cylindrical configurations. FIG. 2B provides a schematic partial top sectional view illustration of an example configuration for the container 120, the induction coil 140, and the ferromagnetic metal member 160 removably receivable within the container 120, wherein both the ferromagnetic member 160 and the induction coil 140 are arranged in partial cylindrical configurations. Other configurations are possible, for example, at least one of the ferromagnetic member 160 and the induction coil 140 can be arranged in a partial cylindrical configuration.

Referring to FIGS. 1, 2A, 2B, 3B, 4-5, 6A, 6B, 8 and 9, the ferromagnetic member 160 is disposed within the container 120 at a suitable location, height, or proximity relative to the induction coil 140 such that when the induction coil 140 is supplied with a high-frequency alternating current (AC), the ferromagnetic member 160 is heated by eddy currents generated therein. For example, in some embodiments, the induction coil 140 is arranged to space apart from the ferromagnetic member 160 at a predetermined distance that is about 0.4 cm or greater. Preferably, the induction coil 140 is arranged to space apart from the ferromagnetic member 160 at a predetermined distance ranging from about 0.5 cm to 8 cm. In essence, when coupled with the induction coil 140, the ferromagnetic member 160 acts as an induction-heating element that is removably receivable within the container 120.

Advantageously, various embodiments of the electrically conducting member 160 described herein provide an induction-heating element for removable placement within a container 120 of a food processor 100 at least partially enclosed by an induction coil 140 at a suitable location for heating generation by way of inductive coupling with the induction coil 140. The electrically conducting member 160 can be configured for use with any conventional jars or food containers commonly found in existing blenders or the like, and allow those conventional jars to be adapted for use with the food processor 100 described herein.

In reference to FIGS. 1-9, when in use, a user may secure the container 120 on the base 110 at a predetermined engagement position, insert the ferromagnetic member 160 into the container 120 and place it at a suitable location for coupling with the induction coil 140 (for example on the bottom portion 126, but can be other locations as described herein), add food into the container 120, cover the container 120 with the lid 114, and select and run the desired food processing program. After the food processing is completed, the user may extract the processed food, and manually remove the ferromagnetic member 160 from the container 120 for cleaning.

Advantageously, example embodiments of the food processor 100 as described herein allow the induction heating element (e.g. the ferromagnetic member 160) to be easily inserted into and removed from the container 120. This provides a number of benefits over the prior art induction heating blenders.

In prior art, the food container is commonly made entirely of metallic material to generate heat in combination with an induction coil. This will burn protein, starch and/or food particles to make them stick to almost the entire heated metal inner walls of the food container when the food is heated to a relatively high temperature. As a result, the entire food container frequently needs to be cleaned to remove the sticky burnt food from the inner walls of the food container. Due to the large size of the food container, the cleaning job is difficult, and usually can only be done inconveniently at a kitchen sink, as it will not easily fit into a regular dishwasher. In addition, the cleaning of any food stuck on the bottom of the metal container presents further difficulty because the blades are commonly installed on the bottom of the container, and if not removed before cleaning, are dangerous to a cleaner's hands.

Unlike the prior art, which used a metallic induction heating element that was built-in with or form an integral part of the food container, the present invention provides a removable induction heating element 160 receivable within the container 120. Thus, the induction heating element 160 can be easily cleaned separately from the container 120. Advantageously, the relative compact size of the induction heating element 160 means that it can be washed with the convenience of a dishwasher. Further, hand cleaning the induction heating element 160 is safe because it can be done without getting too close to the blades or without uninstalling the blades for safety reason. In addition, the container 120 or a portion thereof now can be made of non-metallic materials so that it is less prone to have food stuck thereon, and therefore will require less time and effort to clean. Moreover, placing the induction heating element 160 within the container 120 means that the heat is substantially exchanged within the container 120, and consequently significantly less heat will be dissipated or transferred to the exterior wall of the container 120, thereby preventing the user from being scalded during the operation of the food processor 100, and improving the energy efficiency of the food processor 100.

In some embodiments of the present invention, the sidewall 124 of the container 120 or a portion thereof is made of electrically insulating material, or otherwise non-metallic materials. Preferably, the sidewall 124 of the container 120 is made of optically transparent materials so that the food mixing process can be visible to a user. In some preferred embodiments, the sidewall 124 of the container 120 or a portion thereof is made of glass or transparent plastic suitable for cooking and/or blender applications. Advantageously, glass or plastic container 120 weighs less than a metal one, and improves user experience of the food processor 100.

In some embodiments, as shown in FIGS. 5, 5A-5C, the electrically conducting member 160 comprises a flange portion inwardly extending from a lower portion of the electrically conducting member. For example, the ferromagnetic member 160 may comprise a substantially annular portion 162 or annular sector 164 extending inwardly from a lower portion of the ferromagnetic member 160. Advantageously, the annular portion/sector 162/164 improves the stability of the ferromagnetic member 160 when being placed on the bottom portion 126 of the container 120. In some embodiments, the annular sector/portion 164/162 extends inwardly toward a center of the annular sector/portion 164/162 and extends along a periphery of the ferromagnetic member 160. In some embodiments, the annular portion 162 comprises at least one annular sector 164. In some embodiments, the angle of the annular portion/sector 162/164 is substantially the same as the angle of the ferromagnetic member 160, while in other embodiments, the angle of the annular portion/sector 162/164 is different from the angle of the ferromagnetic member 160 (i.e. larger or smaller). Another advantage is that a further induction coil 141 can be supported by the base 110 and arranged in proximity to the annular portion 162 or annular sector 164 so as to provide a further induction-heating element for heating at least a portion of the bottom portion 126 of the container 120, as illustrated in FIG. 5.

Referring to FIGS. 3A, 3B, 6A, 6B, and 6, in some example embodiments, the container 120 comprises a heating element support structure 172 for supporting the removable electrically conductive member or ferromagnetic member 160 within the container 120. The heating element support 172 can be formed as a part of the container 120, or can be attached thereto. The heating element support 172 can take any suitable form and be disposed at any suitable location within the container 120. Preferably, the heating element support 172 is formed on an inner wall of the container 120, including an inner surface of the sidewall 124 or an inner surface of the bottom portion 126. For example, in some embodiments, the heating element support 172 is constructed and arranged as a channel 172a or a groove 172b on the bottom portion 126 for receiving a lower portion of the ferromagnetic member 160 therein. In some other embodiments, the heating element support 172 is constructed and arranged as at least one ledge 172c on the sidewall 124 for supporting the ferromagnetic member 160 at a height substantially matching the height of the induction coil 140 such that when the induction coil 140 is supplied with a high-frequency AC, the ferromagnetic member 160 is heated by eddy currents generated therein. The ledge 172c may be substantially continuous to form an annular ledge or a partially annular ledge, or may comprise a plurality of spaced apart ledges. It is to be noted that the heating element support 172 is not limited to the structures described herein, and may include other structures or variations providing identical or similar functionality.

Referring to FIGS. 7A-7B, 8 and 9, in some example embodiments, the ferromagnetic member 160 comprises a support frame 174 for supporting and/or stabilizing the ferromagnetic member 160 within the container 120. The support frame 174 comprises one or more elongated support members 176 having a first end 176a connected to the ferromagnetic member 160 or a part thereof, and a second end 176b operable to removably engage with at least one of the container 120 and the lid 114. In some embodiments, the first end of the at least one elongated support member 176 is fixedly attached to the ferromagnetic member 160 or a part thereof, by fastening means such as fasteners, rivets, welding or any other suitable connecting devices or mechanisms. In some embodiments, the first end of the at least one elongated support member 176 is pivotal or movable relative to the ferromagnetic member 160 to provide flexibility in fitting the ferromagnetic member 160 including the support frame 174 within the container 120. As an example only, the first end of the elongated support member 176 can be coupled to the ferromagnetic member 160 by movable joints, or secured through an aperture provided on the ferromagnetic member 160 or a part thereof to allow certain degree of relative movement or pivoting between the ferromagnetic member 160 and the elongated support member 176.

In some embodiments, the second end of at least one elongated support member 176 is operable to frictionally engage with the top rim of the sidewall 124. For example, the second end of at least one elongated support member 176 may comprise a hook, bent portion, or extension for frictionally engaging the top rim of the sidewall 124 or a portion thereof. In some embodiments, one or more slots or notches can be provided along the top rim of the sidewall 124 or a portion thereof, for removably engaging, receiving or securing the second end of at least one elongated support member 176. In some embodiments, the ferromagnetic member 160 comprises at least one reinforcing member 182 connecting one or more elongated support members 176. For example, at least one reinforcing member 182 can be a reinforcing ring disposed toward the second ends of the connected support members 176, or anywhere between the first and second ends of the connected support members 176. Any of the support frame 174, the one or more elongated support members 176, and the at least one reinforcing member 182 can be made of any suitable materials in any suitable forms, such as stainless steel wires or any equivalent or similar materials and/or structures.

In some embodiments, the one or more elongated support members 176 form a substantially dome shaped frame comprising a central portion 186 for removably coupling with the lid 114 or a portion thereof. For instance, an upper portion 177 of each of the one or more elongated support members 176 may extend inwardly toward each other to converge at the central portion 186. The inward extension is not limited in any way in shape and form, and can comprise curved or straight segments or any combination thereof. In some embodiments, the central portion 186 comprises a substantially circular member for removably coupling with or connecting to the lid 114 or a portion thereof. For example, the lid 114 may comprise a matching circular shaped structure 188 for removably receiving or securing the central portion 186, so that when the lid 114 is covering the container 120, the ferromagnetic member 160 is supported and/or stabilized within the container 120 by the support frame 174.

Figure 8:
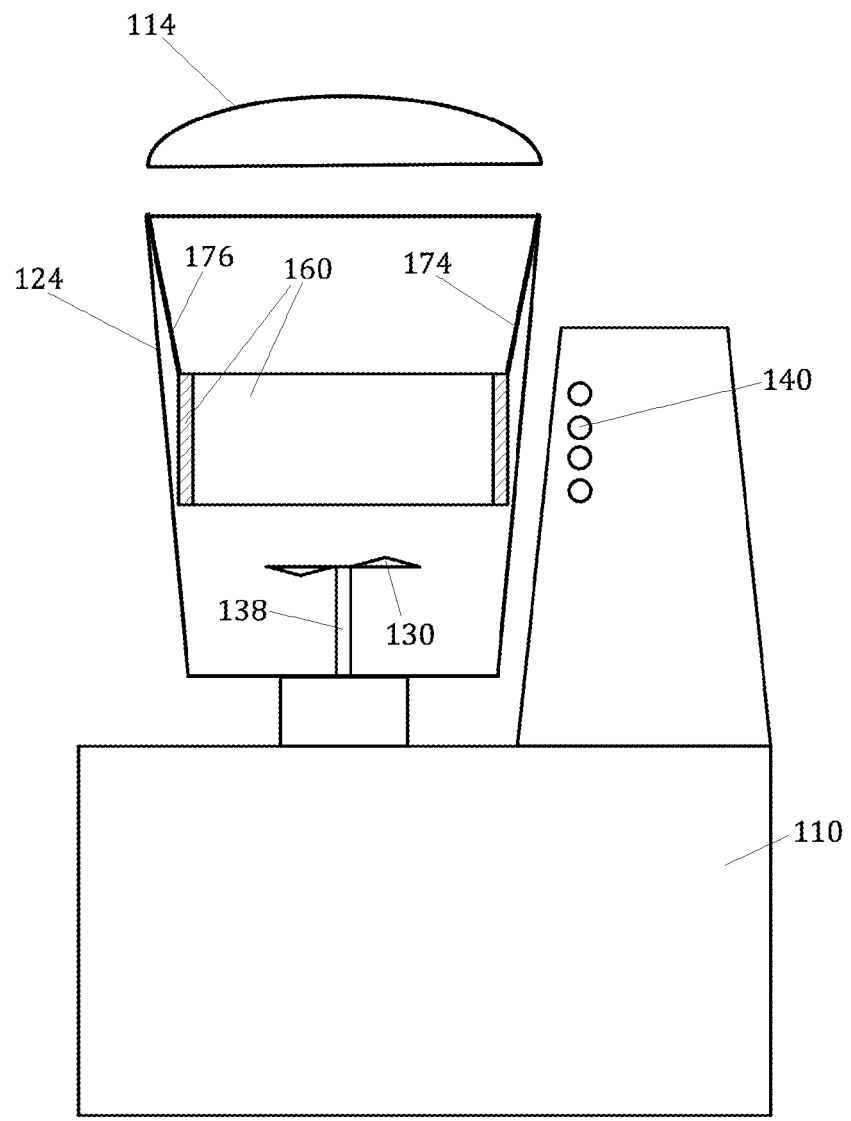
FIG. 8 is a schematic representation of a partial sectional side view illustrating a food processor in accordance with a further example embodiment of the present disclosure.
Figure 9:
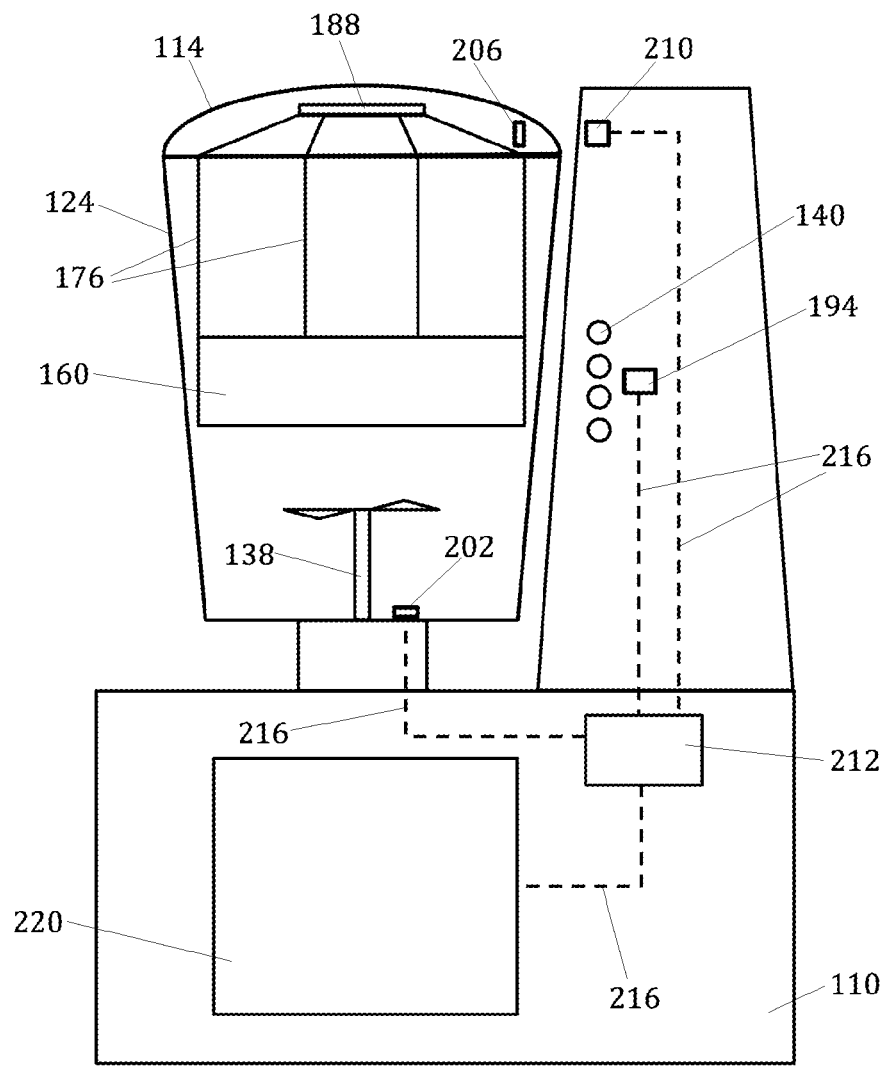
FIG. 9 is a schematic representation of a partial side view illustrating a food processor in accordance with a further example embodiment of the present disclosure.

In some embodiments, the ferromagnetic member 160 is supported and/or stabilized within the container 120 by the support frame 174 above the bottom portion 126 of the container 120. As illustrated in FIGS. 8-9, the ferromagnetic member 160 is suspended by the support frame 174 at a predetermined height above the bottom portion 126, wherein the predetermined height substantially matches the height of the induction coil 140 such that when the induction coil 140 is supplied with a high-frequency AC, the ferromagnetic member 160 is heated by eddy currents generated therein.

Advantageously, the ferromagnetic member 160 can be removably disposed at any height relative to the bottom portion 126 within the container 120, by using the support frame 174 having desirable dimensions. Preferably, in some embodiments, at least a portion of the ferromagnetic member 160 is supported at a height above the blade or knife 130 of the mixing member 128. Such arrangement allows the food to be heated more efficiently and consistently while being cut or chopped by the blade or knife 130 of the mixing member 128. This is because the high-speed rotational movements of the blade 130 tend to push the food upwardly at a force that is smaller relative to the radially outward force pushing the food toward the sidewall 124 of the container 120. As a result, when the food is being heated at a height above the blade 130, the food moves at a relatively slower speed and can be heated more thoroughly and evenly, and is unlikely to stick to the ferromagnetic member 160.

A further advantage is that the support frame 174 described herein can secure or fasten the ferromagnetic member 160 to the container 120 or a part thereof, or the lid 114 or a part thereof, to reduce or minimize the movements of the ferromagnetic member 160 relative to the container 120 and/or the rotating blades 130. Accordingly, in certain situations, the ferromagnetic member 160 equipped with the support frame 174 described herein has a further advantage of preventing the spinning of the blades 130 from causing the ferromagnetic member 160 to be pushed out of an optimal position for induction heating.

In some embodiments, a plurality of ferromagnetic members 160 described herein can be disposed within the container 120 to achieve desired heating and/or mixing results. For example, two or more ferromagnetic members 160 can be placed at different heights within the container 120, while the induction coil 140 can be arranged into two or more groups corresponding to respective ferromagnetic members 160 at respective heights. In some embodiments, a food contacting surface of at least one ferromagnetic member 160 is coated with or integrally covered by a layer of metal or alloy material having a higher thermal conductivity than the ferromagnetic member 160, including copper, aluminum, any alloy thereof, and any other similar materials.

Referring to FIG. 9, in some embodiments, the food processor 100 comprises one or more devices for sensing, detecting, collecting, or measuring states, status, operations, data, and/or attributes of the food processor 100, components thereof, and the food contained therein. For example, in some embodiments, the food processor 100 comprises a temperature sensor 202 located within the container 120 for detecting the temperature of the food during the food preparation operations. Preferably, such temperature sensor is arranged to measure the temperature at or near the bottom portion 126 of the container 120. In addition, the food processor 100 may optionally include a device for detecting the status of lid 114, such as the presence of the lid 114, and/or whether the lid 114 is properly positioned or aligned with the container 120 for food processing. In some embodiments, the food processor 100 comprises a magnetic element 206 and a magnetic switch 210 respectively disposed on the lid 114 or a part thereof and the base 110 or a part thereof, or vice versa, configured and arranged to open or close an electric circuit coupled to the magnetic switch 210 to indicate a first status where the lid 114 is properly placed on the container 120 or in position for food mixing, and a second status where the lid is not in a position for food mixing. It is also possible to provide the magnetic element or the magnetic switch on the container 120 or a part thereof, or any other suitable location without departing from the principle described herein. In some embodiments, the detected lid status information corresponding to the opening and closing of the electric circuit coupled to the magnetic switch 210 is transmitted by wireless communication or wired communication to a control unit located in the base 110 as an input for the operations of the food processor 100.

In some embodiments, the food processor 100 comprises at least one eddy current sensor or magnetometer 194 for detecting the presence of the ferromagnetic member 160 within the container 120. For example, such eddy current sensor 194 or magnetometer can be installed in or supported by the base 110 or a part thereof in proximity to a predetermined location for the ferromagnetic member 160 within the container 120, as illustrated in FIG. 9. In some embodiments, a plurality of eddy current sensors 194 or magnetometers can be deployed for detecting whether the ferromagnetic member 160 is properly aligned with or substantially equally spaced from the induction coil 140 within the container 120.

The base 110 or a part thereof may host or enclose one or more computer processors or programmable logic controllers 212 for controlling the operations of the food processor 100 in response to user inputs and/or various environmental inputs and/or parameters. For example, the information and data collected or measured by sensors or other detecting devices can be transmitted or presented as inputs to the one or more computer processors or programmable logic controllers 212, via suitable communication means 216 such as wireless or wired communications or signal transfer mechanisms, including by way of Wi-Fi connections, Bluetooth™ connections, wired connections, electromagnetic coupling including inductive coupling and capacitive coupling, and/or any other substantially equivalent or similar means or methods. The base 110 or a part thereof may also include various computer memory modules, including non-transitory computer-readable medium, for storing control programs, food processing programs, real-time operating data, measurements, and other programs, codes and data. The base 110 may include a user interface 220, such as a display, keypad, buttons, dials and any other suitable input and output means.

Although the present invention has been described in considerable detail with reference to certain example embodiments thereof, other embodiments and modifications are possible. Therefore, the scope of the appended claims should not be limited by the preferred embodiments set forth in the examples, but should be given the broadest interpretation consistent with the description as a whole.

The invention claimed is:

1. A food processor comprising:
   a base;
   a container removably mountable on the base that receives food, the container comprising a ledge formed on an inner wall of the container;
   an electrically conducting member removably receivable within the container, the electrically conducting member mountable on the ledge;
   a rotatable mixing member disposed within the container that processes the food, wherein the ledge is formed at a height above the rotatable mixing meber; and
   an induction heating device supported by the base and being constructed and arranged to enclose at least a portion of a sidewall of the container.

2. The food processor of claim 1, further comprising an eddy current sensor that detects a presence of the electrically conducting member within the container.

3. The food processor of claim 1, wherein at least a portion of the container is made of transparent material.

4. The food processor of claim 1, wherein at least a portion of the container is made of glass or plastic.

5. The food processor of claim 1, wherein the electrically conducting member is a ferromagnetic metal.

6. The food processor of claim 1, wherein the electrically conducting member is ring-shaped.

7. The food processor of claim 1, wherein the electrically conducting member comprises a support frame that couples to at least one of the container and a lid of the food processor.

8. The food processor of claim 1, wherein the induction heating device is an induction coil.

9. The food processor of claim 1, further comprising a temperature sensor disposed within the container.

10. The food processor of claim 1, further comprising a lid that covers the container.

11. The food processor of claim 10, further comprising a device that detects a first lid location wherein the lid is in position relative to the container, and a second lid location wherein the lid is out of position relative to the container.

12. The food processor of claim 1, wherein a food contacting surface of the electrically conducting member is covered by a layer of metal or alloy having a higher thermal conductivity than the electrically conducting member.

* * * * *

UNITED STATES PATENT AND TRADEMARK OFFICE
CERTIFICATE OF CORRECTION

| | |
|---|---|
| PATENT NO. | : 11,439,272 B2 |
| APPLICATION NO. | : 16/546954 |
| DATED | : September 13, 2022 |
| INVENTOR(S) | : Jiwei R. Wang and Yi Qin |

It is certified that error appears in the above-identified patent and that said Letters Patent is hereby corrected as shown below:

In the Claims

In Column 10, Claim 1, Line 55, delete "meber" and replace with --member--

Signed and Sealed this
Eighth Day of November, 2022

Katherine Kelly Vidal
*Director of the United States Patent and Trademark Office*